(12) United States Patent
Hamada et al.

(10) Patent No.: US 8,149,476 B2
(45) Date of Patent: Apr. 3, 2012

(54) DOCUMENT READING APPARATUS

(75) Inventors: Masataka Hamada, Fuefuki (JP);
Fumihito Endo, Minamialps (JP);
Junya Nakajima, Minamialps (JP); Koji Kanda, Kai (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 515 days.

(21) Appl. No.: 12/453,454

(22) Filed: May 12, 2009

(65) Prior Publication Data
US 2009/0284808 A1 Nov. 19, 2009

(30) Foreign Application Priority Data
May 14, 2008 (JP) ................................. 2008-127693

(51) Int. Cl.
*H04N 1/04* (2006.01)
(52) U.S. Cl. ......... 358/474; 358/487; 358/497; 358/486
(58) Field of Classification Search .................. 358/474, 358/487, 497, 486, 498
See application file for complete search history.

(56) References Cited

U.S. PATENT DOCUMENTS

| | | | | |
|---|---|---|---|---|
| 5,345,403 | A * | 9/1994 | Ogawa et al. | 361/679.26 |
| 7,536,148 | B2 * | 5/2009 | Fukumura | 399/367 |
| 2007/0127962 | A1 * | 6/2007 | Fukumura | 399/367 |

FOREIGN PATENT DOCUMENTS

| | | |
|---|---|---|
| JP | H05-130330 | 5/1993 |
| JP | H07-231378 | 8/1995 |

* cited by examiner

*Primary Examiner* — Houshang Safaipour
(74) *Attorney, Agent, or Firm* — Manabu Kanesaka

(57) ABSTRACT

Provided is a document reading apparatus in which an original document fed by feeding means to contact glass having a predetermined reading position is read by reading means. Then, the document reading apparatus is provided with a guide unit having a guide member for guiding the original document to be fed to the contact glass, and a backup unit to back up the original document to be read, and the guide unit is configured to be able to travel between a close position to near the contact glass and an open position to distance from the contact glass. In the guide unit is formed a concave portion for removably accommodating the backup unit, and the backup unit is configured so that an original document guide face of the guide member and an original document guide face in the backup unit form a continuous guide face when the guide unit travels to the close position.

Then, the guide unit is moved to the open position to perform cleaning of the backup unit and contact glass. Further, the backup unit is removed to perform maintenance.

6 Claims, 9 Drawing Sheets

500
DOCUMENT READING APPARATUS

BACKGROUND OF THE INVENTION

1. Field of the Invention

The present invention relates to an image reading apparatus for reading a transported original document, and more specifically, to an image reading apparatus having a shading unit provided opposite to a reading surface to read an original document.

2. Description of the Related Art

There has conventionally been known the so-called sheet-through type image reading apparatus which is an apparatus for reading an image of an original document passed through a reading section of a transport path by a reading unit at rest. In such an image reading apparatus, concentration differences occur in a read image by fluctuations in sensitivity for each pixel of a photoelectric converter constituting an image reading means, fluctuations in quantity of light and characteristics of a light source, reflecting mirrors and the like, variations in image formation by a lens and the like, etc. To correct the concentration differences, a shading plate formed of a plate-shaped white member is disposed in a position opposite to a reading platen, the shading plate is read at arbitrary timing to obtain shading correction data, and an excellent read image is formed by capturing the shading correction data into the image data (for example, Japanese Laid-Open Patent Publication Nos. H05-130330 and H07-231378).

In general, the shading plate often has a structure where the plate is fixed in the position opposite to the reading surface on the reading unit side, or the plate is attached by inserting into an insertion hole in the opposite position provided integrally with the reading surface.

However, in the structure where the white shading plate to acquire the shading correction data is fixed in the position opposite to the reading surface, when dust, stain or the like adheres to the surface of the shading plate, to remove the dust or stain, the problem arises that the apparatus body with the shading plate attached needs to be disassembled. Further, when the shading plate is attached after once the apparatus body is disassembled, another problem occurs that alignment with the reading surface is not easy.

Moreover, even when part of the shading plate is stained, the shading plate needs to be replaced. Alternately, when the shading plate is in film form, a new film needs to be bonded after removing the old film. Therefore, it takes time to perform cleaning and maintenance, interfering with the operation of the image reading apparatus.

Hence, it is an object of the invention to provide a document reading apparatus having a detachable structure to facilitate cleaning and maintenance of a shading plate to form a transport path of an original document and perform shading processing, while enabling reading processing for an excellent image to be executed even when the shading plate is stained or the like.

SUMMARY OF THE INVENTION

To solve the above-mentioned problems, a document reading apparatus of the invention is configured so that a backup unit, disposed opposite to contact glass to read an original document, having a white member to back up the read original document, is removably attached to a guide member, and that the guide member is rotated to a position enabling the backup unit to be attached and detached.

In this way, by rotating the guide member with the backup unit inserted, it is made possible to attach and detach the backup unit, while the contact glass is exposed, it is thereby possible to concurrently perform maintenance such as cleaning of the backup unit, position adjustment of the white member and the like, and maintenance such as cleaning of the contact glass and the like, and the maintenance work is thus made ease.

DESCRIPTION OF THE PREFERRED EMBODIMENTS

Figure 1:
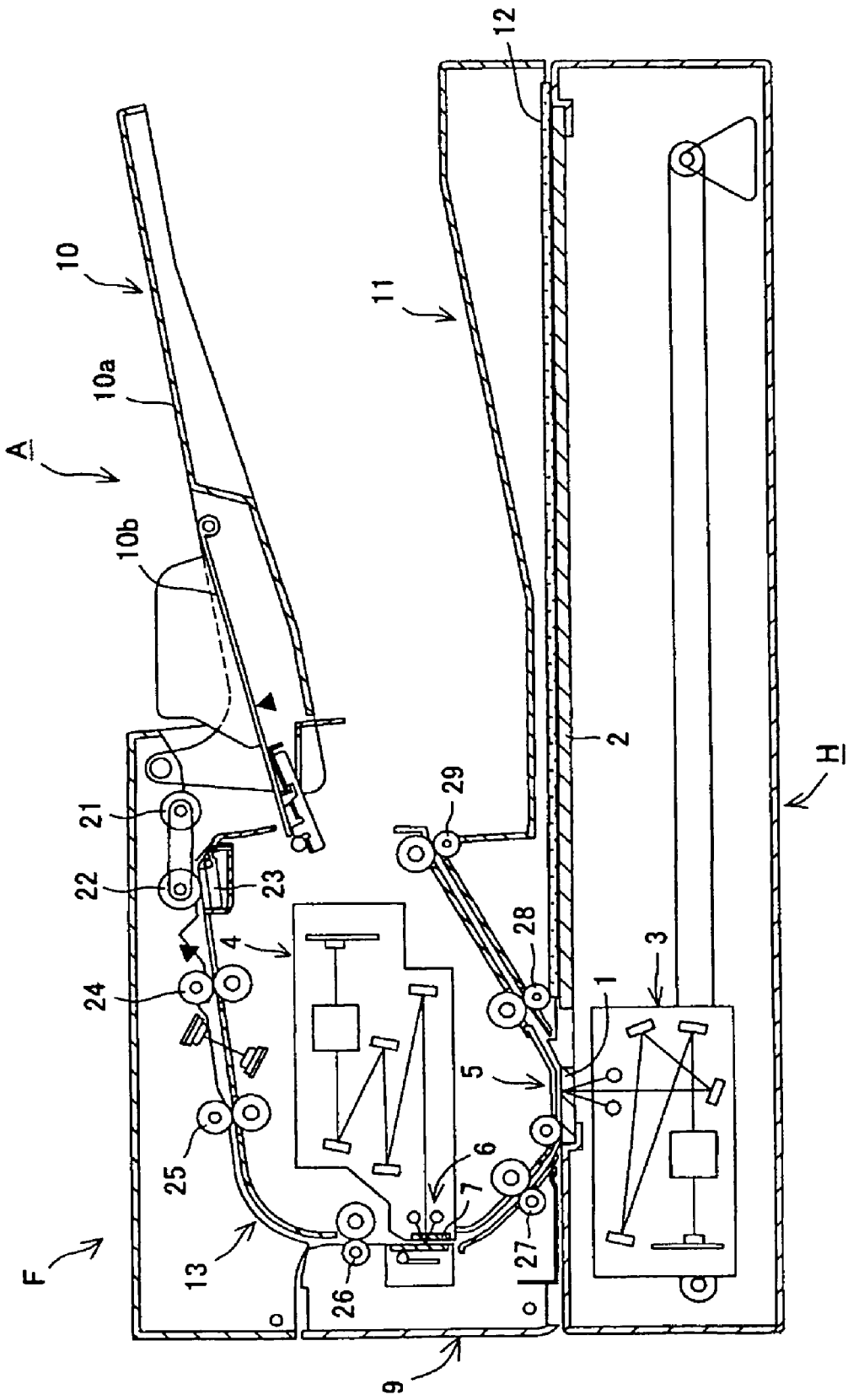
FIG. 1 is a cross-sectional view showing the entire image reading apparatus provided with a document feeding apparatus according to the invention.
Figure 2:
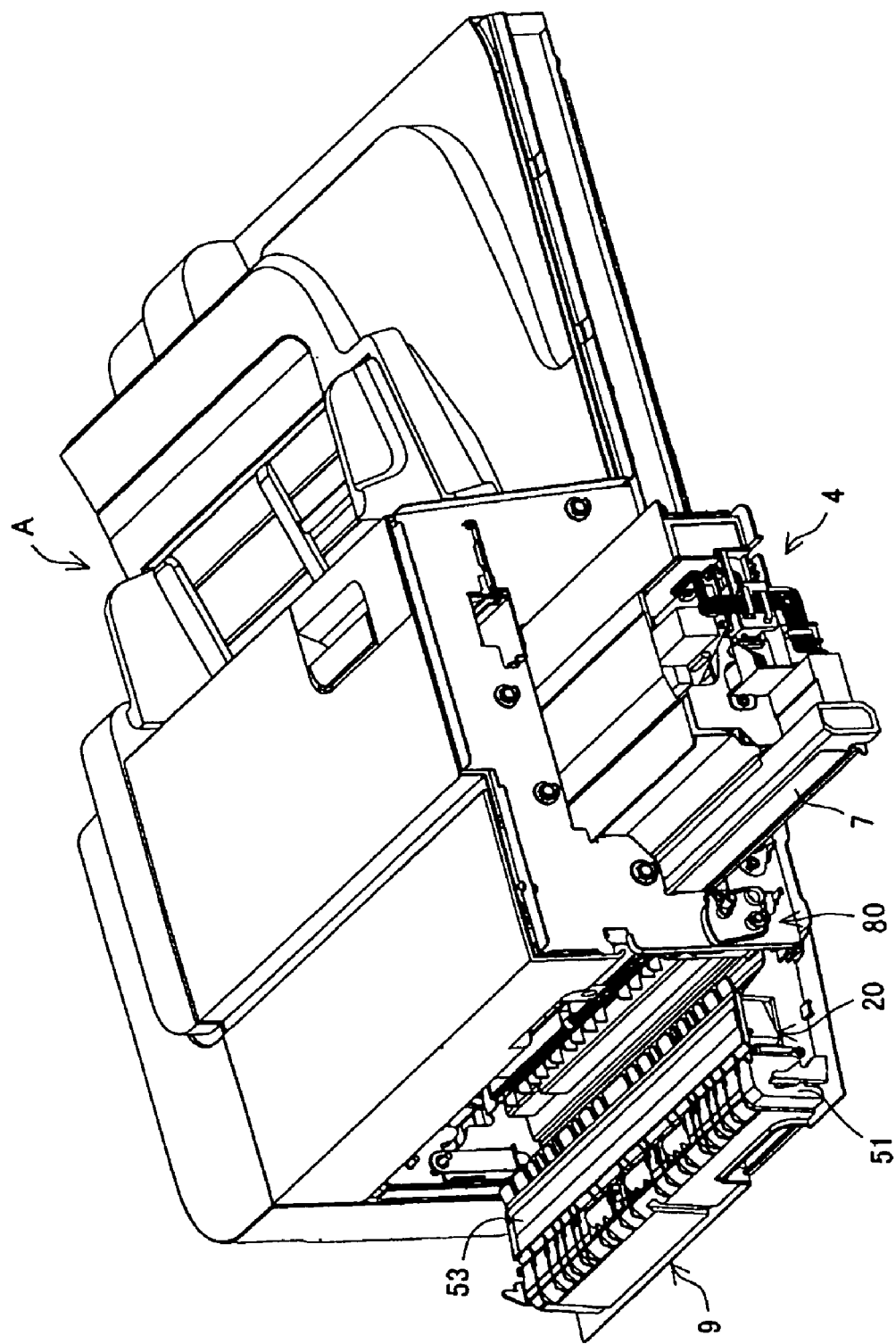
FIG. 2 is a perspective view of the document feeding apparatus.
Figure 3:
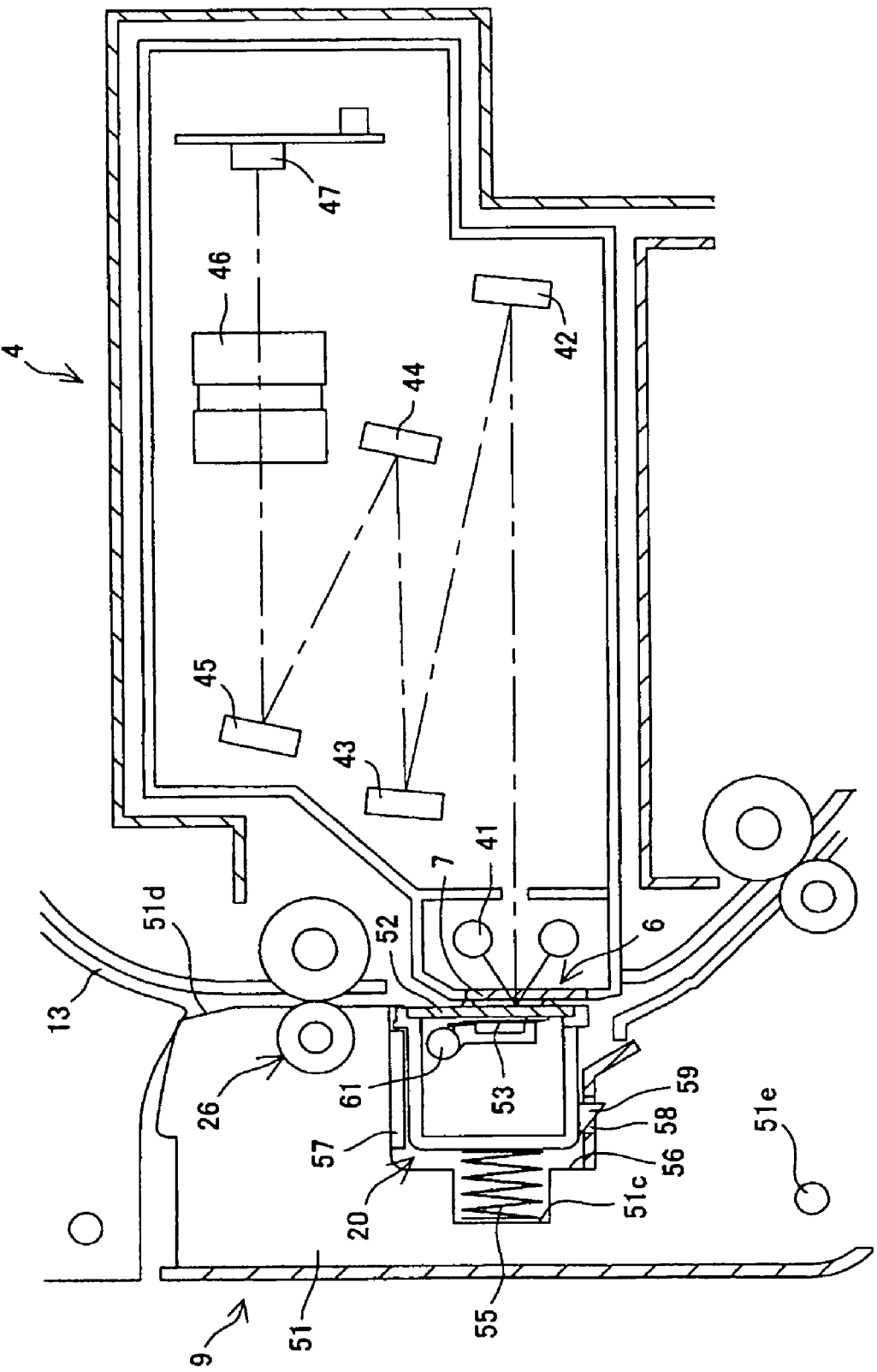
FIG. 3 is a cross-sectional view of a principal part of the document feeding apparatus.

FIG. 1 is a cross-sectional view showing an image reading apparatus installed with a document feeding apparatus, FIG. 2 is a perspective view of the document feeding apparatus, and FIG. 3 is an enlarged cross-sectional view of the document feeding apparatus.

In FIGS. 1 and 2, "A" denotes the document feeding apparatus mounted on the top of the image reading apparatus body H. This document feeding apparatus A is disposed so that an original document is passed and transported on first platen glass 1 provided on the top surface of the image reading apparatus H.

The image reading apparatus H is provided with a first reading unit 3 for applying light emitted from a light source such as a lamp or the like to an original document through the first platen glass 1, reflecting the reflected light with a plurality of mirrors, performing photoelectric conversion on the light via a lens with a photoelectric conversion means such as a CCD or the like, and thereby reading the original document image, and a first reading section 5 of the image reading apparatus H is formed on the top surface of the first contact glass 1. Further, the image reading apparatus H is provided with second platen glass 2 at the back of the first platen glass 1. The second platen glass 2 is configured to read an original document image by opening the document feeding apparatus A upward, mounting a thick original document such as a book, magazine and the like on the second platen glass 2, and shifting the first reading unit 3 in the sub-scanning direction.

The document feeding apparatus A is provided with a paper feed tray unit 10 to mount an original document, a paper discharge tray 11 disposed below the paper feed tray unit 10 to store the original document such that the original document image is read by the image reading apparatus H, a pressing cover 12 to press the second platen glass 2, and a U-shaped transport path 13 to transport the original document to the paper discharge tray 11 from the paper feed tray unit 10. In addition, the pressing cover 12 is formed of a porous member such as, for example, sponge or the like, and a film member such as a white Mylar sheet or the like. Further, the paper feed tray unit 10 is formed of a paper feed tray 10*a* for supporting the rear end side of an original document, and an up-and-down tray 10*b* for moving up and down between a set position for mounting the original document and a feeding position for feeding the document.

Further, in the document feeding apparatus A, a second reading unit 4 for reading an image on the back side of the original document is provided in a bend of the U-shaped transport path 13. As shown in FIG. 3, the second reading unit 4 has a light source 41 such as a lamp or the like for applying light to an original document transported on contact glass 7, a plurality of mirrors 42, 43, 44, 45 for leading the reflected light from the original document in a predetermined direction, a lens 46 for causing the reflected light lead by the plurality of mirrors 42, 43, 44, 45 to converge, and a photo-electric conversion element 47 for performing photoelectric conversion on the light gathered by the lens 46.

Then, an original document is irradiated with the light emitted from the light source 41 such as the lamp or the like through the contact glass 7 forming part of the transport path 13, the reflected light is reflected by the plurality of mirrors 42, 43, 44, 45, and subjected to photoelectric conversion by the photoelectric conversion means 47 such as a CCD or the like via the lens 46, and the original document image is thus read. In addition, herein, the top surface of the contact glass 7 is formed as a second reading section 6 of the image reading apparatus H.

In the document feeding apparatus A, the second reading unit 4 reads an original document image on one side of the original document passed through the second reading section 6 at some midpoint in the transport path 13, while the first reading unit 3 reads an original document image on the other side of the original document passed through the first reading section 5, and it is thereby possible to greatly reduce the image reading time of a two-sided original document.

The U-shaped transport path 13 has a feeding roller 21 to feed original documents from the paper feed tray unit 10, separating means formed of a paper feed roller 22 and separating pad 23 to separate the documents fed from the feeding roller 21 on a sheet basis to feed, and a resist roller pair 24 for aligning the front end of the original document by the front end of the document fed from the paper feed roller 22 hitting a nip point of the resist roller pair 24, thereby removing skew, and then being driven to send the document to the downstream side. Further, the transport path 13 has a sending roller pair 25 for sending the document from the resist roller pair 24 toward the second reading section 6 and first reading section 5, a first read roller pair 26 that is a guide member to supply the document from the sending roller pair 25 to the second reading section 6, and a second read roller pair 27 for supplying the document of which one side is read by the second reading section 6 to the first reading section 5. Furthermore, the transport path 13 has a third read roller pair 28 for carrying out the document of which two sides are read by the second reading section 6 and first reading section 5 from the first reading section 5, and a paper discharge roller pair 29 for receiving the document, which is passed through the first reading section 5 and of which two sides are read, from the third read roller pair 28 to transport toward the paper discharge tray 11. In this embodiment, the transport path 13 is configured as a transport unit F with a plurality of members incorporated thereinto.

Figure 4:
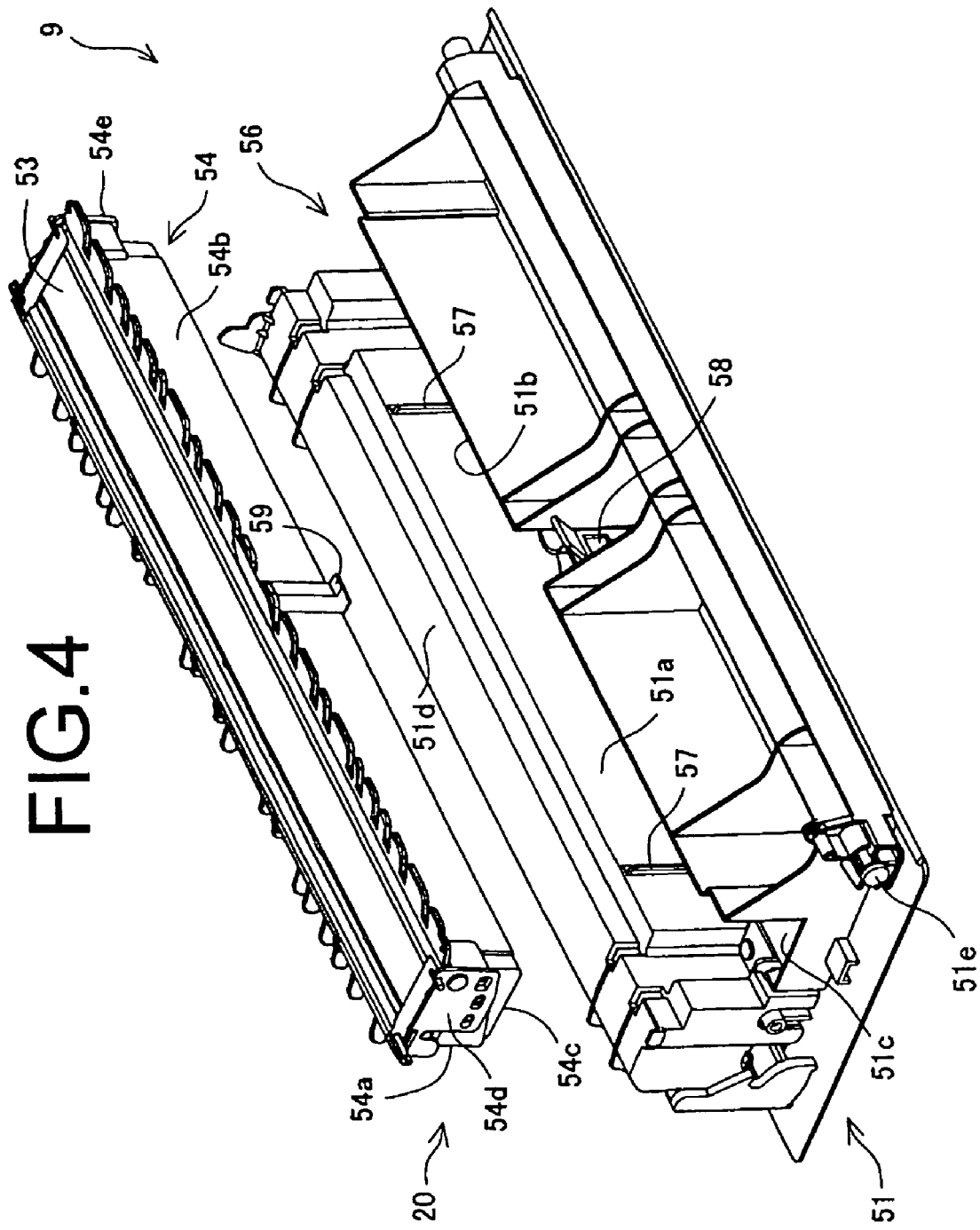
FIG. 4 is a perspective view showing a state before inserting a backup unit into a guide member.
Figure 5:
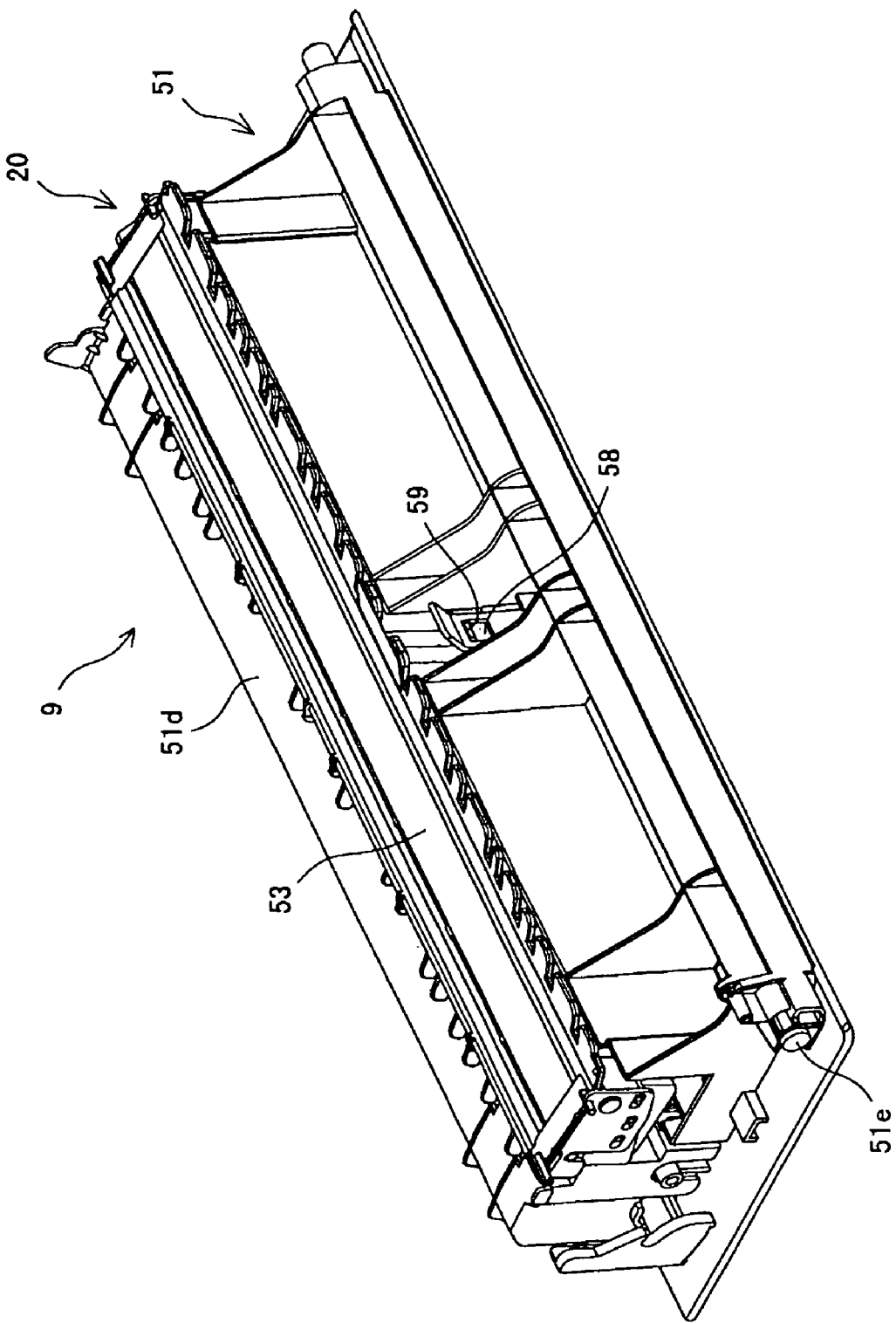
FIG. 5 is a perspective view showing a state where the backup unit is inserted into the guide member.

Herein, as shown in FIG. 3, a guide unit 9 is disposed in a position opposite to the contact glass 7 of the second reading unit 4. As shown in FIGS. 4 and 5, the guide unit 9 is formed of a guide member 51 and a backup unit 20 inserted removably in the guide member 51. The guide member 51 is provided with a concave portion 56 to insert the backup unit 20 therein. On the side opposite to the contact glass 7 above the concave portion, a guide portion 51*d* is formed which is part of the outside transport guide for guiding an original document to the second reading section 6, and a driven roller of the first read roller pair 26 is provided. The original document is guided to the contact glass 7 by the guide portion 51*d* and first read roller pair 26. Further, the guide member 51 is attached to side plates 80 of the document feeding apparatus A as shown in FIG. 2 through a rotation shaft 51*e* provided on the lower side of the member 51, and attached to be opened and closed by the upper side rotating around the rotation shaft 51*e* to enable the backup unit 20 to be attached and detached to/from the concave portion 56. The backup unit 20 is provided with a box-shaped holder member 54 inserted in the concave portion 56, a white member 53 attached to the front of the holder member 54, and a transparent member (backup glass) 52 for protecting the top surface of the white member 53. In addition, the white member 53 is used to acquire reference data to make a shading correction.

Meanwhile, the entire inner wall of the holder member 54 is black, and it is configured to make a backup color of an original document white by shifting the white member 53 to the position opposite to the contact glass 7, and switch the backup color of the original document to black by withdrawing the white member 53 from the position opposite to the contact glass 7. Then, by this configuration, the document is prevented from reflecting by its back side.

The concave portion 56 of the guide member 51 has an upper inner wall 51*a* and lower inner wall 51*b* extending in the longitudinal direction. A pair of protrusions (ribs) 57 are provided closer to the opposite ends in the longitudinal direction of the upper inner wall 51*a*, and an engagement hole 58 is provided in the substantially center portion in the longitudinal direction of the lower inner wall 51*b*. Further, in the bottom 51*c* of the concave portion 56 is disposed a compression spring 55 toward the backup glass 52.

Figure 6:
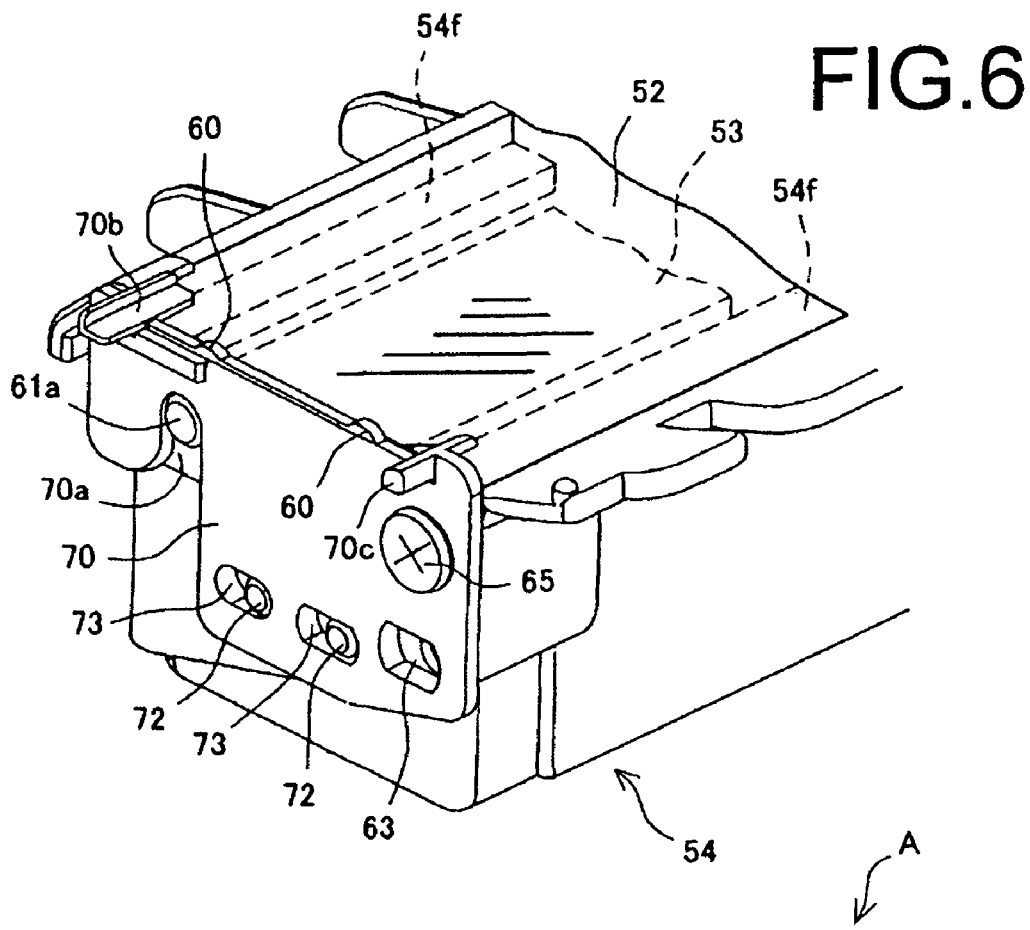
FIG. 6 is a perspective view showing a support structure for supporting a white member.

As shown in FIGS. 4 to 6, the holder member 54 is configured in the shape of a box with an upper side 54*a* and lower side 54*b* mating with the upper inner wall 51*a* and lower inner wall 51*b* of the concave portion 56, the back 54*c* coming into contact with the compression spring 55, and a left side 54*d* and right side 54*e* holding the opposite end portions in the longitudinal direction of the white member 53, and to a front portion 53 are attached the white member 53 and the backup glass 52 to cover the white member 53. Further, an engagement click 59 engaging in the engagement hole 58 of the guide member 51 is provided in the substantially center portion in the longitudinal direction of the lower side 54*b*, and as shown in FIG. 6, a pair of holding members 70, 71 are provided in both side portions of the left side 54*d* and right side 54*e* to hold the opposite end portions in the longitudinal direction of the white member 53 by cooperating with the left side 54*d* and right side 54*e*, while holding the backup glass 52 attached to the front portion 54*f*.

Figure 7:
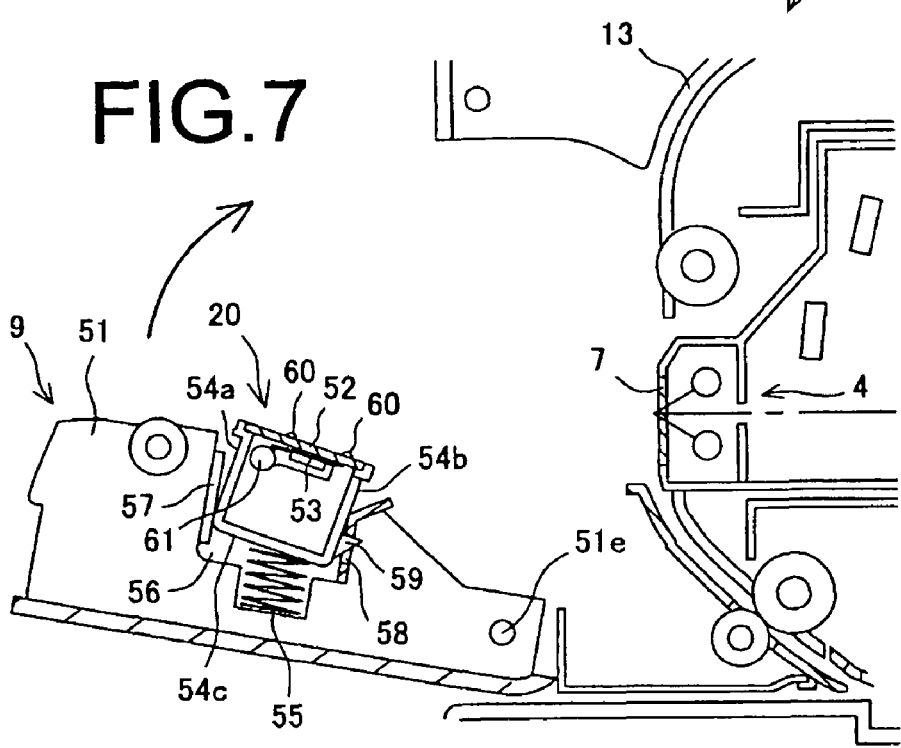
FIG. 7 is a cross-sectional view showing a state where a guide unit is distanced from the document feeding apparatus.

The holder member 54 is inserted in a temporary joint state into the concave portion 56 with the lower side 54b fixed, as shown in FIG. 5, by the upper side 54a coming into contact with the pair of ribs 57 and engaging in the ribs by friction force, and concurrently the engagement click 59 being inserted in the engagement hole 58. At this point, as shown in FIG. 7, since the back 54c of the holder member 54 receives the elastic force and is held by the compression spring 55, the holder member 54 is in a rest state while the upper side 54a is pushed slightly forward with respect to the lower side 54b where the engagement click 59 is engaged in the engagement hole 58. Accordingly, the white member 53 is inclined with respect to the opening of the concave portion 56.

Figure 8:
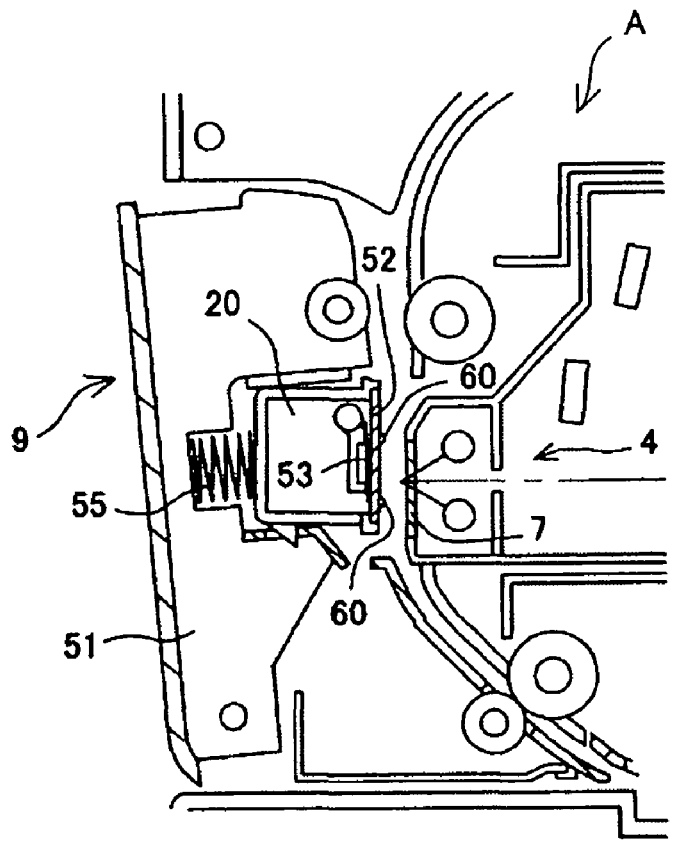
FIG. 8 is a cross-sectional view showing a state immediately before the guide unit is set in the document feeding apparatus.
Figure 9:
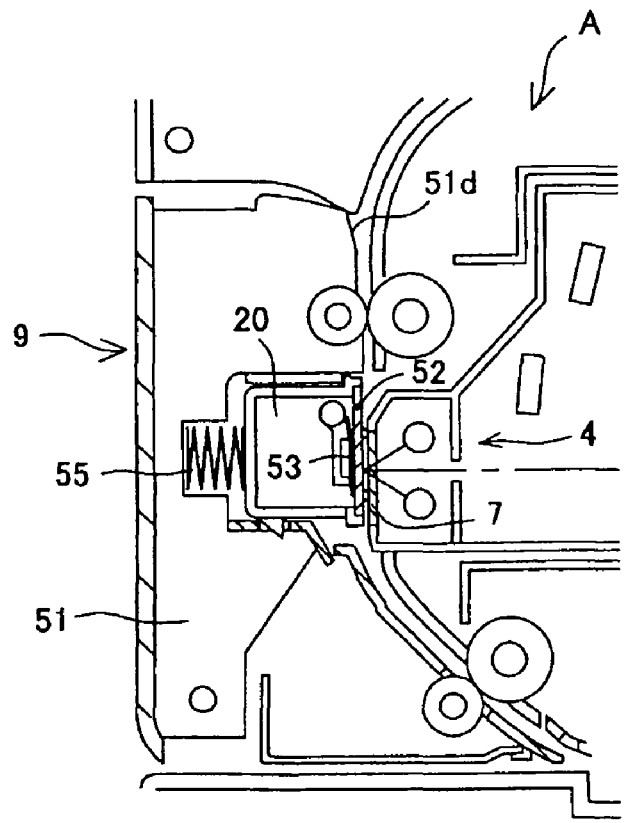
FIG. 9 is a cross-sectional view showing a state where the guide unit is set in the document feeding apparatus.

FIG. 8 shows a state where the backup unit 20 is inserted in the guide member 51, and then the guide unit 9 is rotated toward the contact glass 7 of the reading unit of the document feeding apparatus A. As described above, since the backup unit 20 is inserted in the guide member 51 so that the upper face side is inclined forward, when the guide unit 9 is rotated to the position opposite to the contact glass 7, the white member 53 protected by the backup glass 52 can be opposed in a position substantially parallel with the contact glass 7, and in this state, by pressing the backup glass 52 to the contact glass 7 as shown in FIG. 9, the guide unit 9 is set in the document feeding apparatus A with the backup unit 20 held elastically in the guide member 51 via the compression spring 55.

Further, a plurality of protrusions 60 is provided in opposite end portions out of the document transport range in the document main scanning direction of the guide member 51 of the guide unit 9. Then, by biasing the guide unit 9 to the second reading unit 4 side by the compression spring 55, the plurality of protrusions 60 comes into contact with the document reading surface of the contact glass 7 of the second reading unit 4, and is configured to keep a distance between the contact glass 7 and backup glass 52 at a minimum distance.

Next, the configuration of the backup unit 20 will be described. The white member 53 provided in the backup unit 20 has a flexible white film bonded to its surface, and is attached with the white film surface faced to the front 54f side of the holder member 54, and the white film surface is protected by the backup glass 52. Further, as shown in FIGS. 6, 10 and 11, the white member 53 is provided in its opposite end portions in the longitudinal direction respectively with engagement protrusions 61a, 61b faced outward, and the engagement protrusions 61a, 61b engage in engagement grooves 70a, 71a of the holding members 70, 71 attached to the left side 54d and right side 54e of the holder member 54, respectively.

The holding members 70, 71 will specifically be described below. In addition, this pair of the holding members 70, 71 have the same configuration, and for the sake of convenience, the holding member 70 that is one of the pair will be described herein. As shown in FIG. 6, in this holding member 70 are provided the engagement groove 70a, supporting portions 70b, 70c for sandwiching the backup glass 52 with the edge of the front portion 54f of the holder member 54 to support, the protrusions 60 for coming into contact with the document reading surface of the contact glass 7 to maintain the distance between the contact glass 7 and backup glass 52 at the minimum distance, positioning holes 73 to fit with a plurality of bosses 72 protruding from the left side 54d of the holder member 54, a first insertion hole 75 to insert a mounting screw 65 so as to attach the holding member 70 to the left side 54d of the holder member 54 at normal times, and a second insertion hole 63 to insert a mounting screw 65 in adjusting the position of the white member 53.

In addition, in the left side 54d of the holder member 54, screw holes are formed in portions respectively associated with the first and second insertion holes 75, 63. The mounting screw 65 is inserted into one of the first and second insertion holes 75, 63 and fastened to the corresponding screw hole, and the holding member 70 is thereby attached to the left side 54d of the holder member 54. Further, the first insertion hole 75 is a circular hole to enable the holding member to be positioned reliably, and the second insertion hole 63 is a long hole to enable the holding member 70 to slide. Therefore, the white member 53 enables its end portion to slightly slide on the holder member 54 depending on the fastened position of the mounting screw.

Figure 10A:
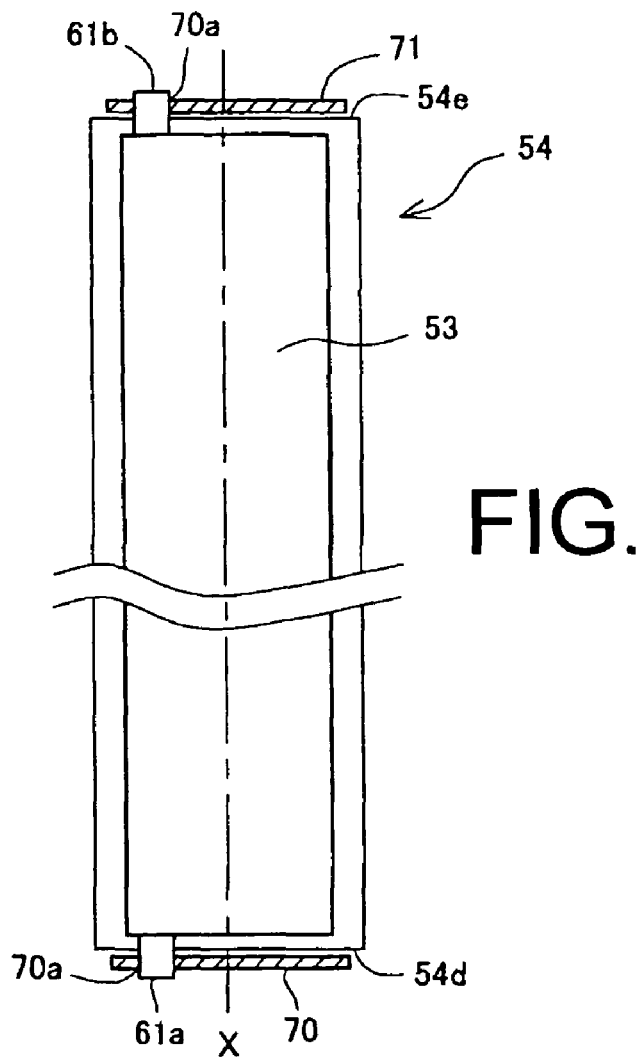
FIG. 10 contains a plan view and cross-sectional view showing a state where the white member is set in a normal position.
Figure 10B:
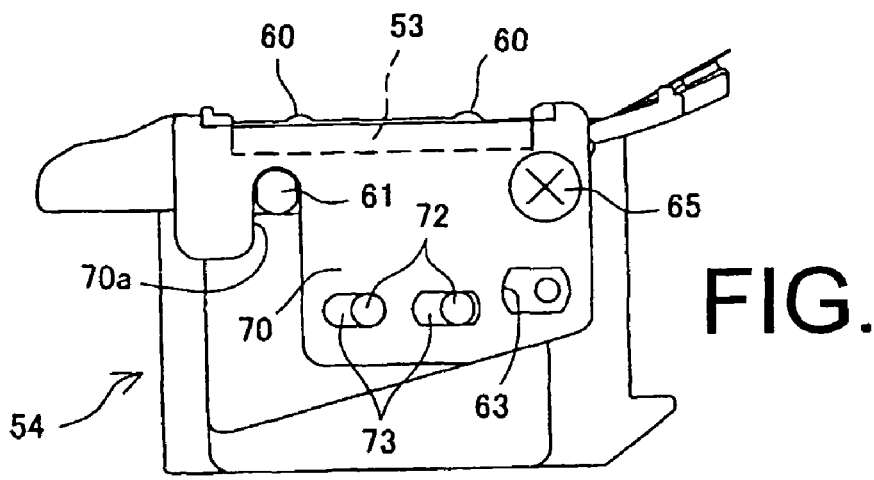

In other words, at normal times, as shown in FIG. 10(b), the mounting screw 65 is inserted into the first insertion hole 75 to attach the holding member 70. At this point, the engagement position of the engagement protrusion 61a held by the holding member 70 is in a state where the white member 53 is straight and parallel to the holder member 54 in the longitudinal direction as shown in FIG. 10(a).

Figure 11A:
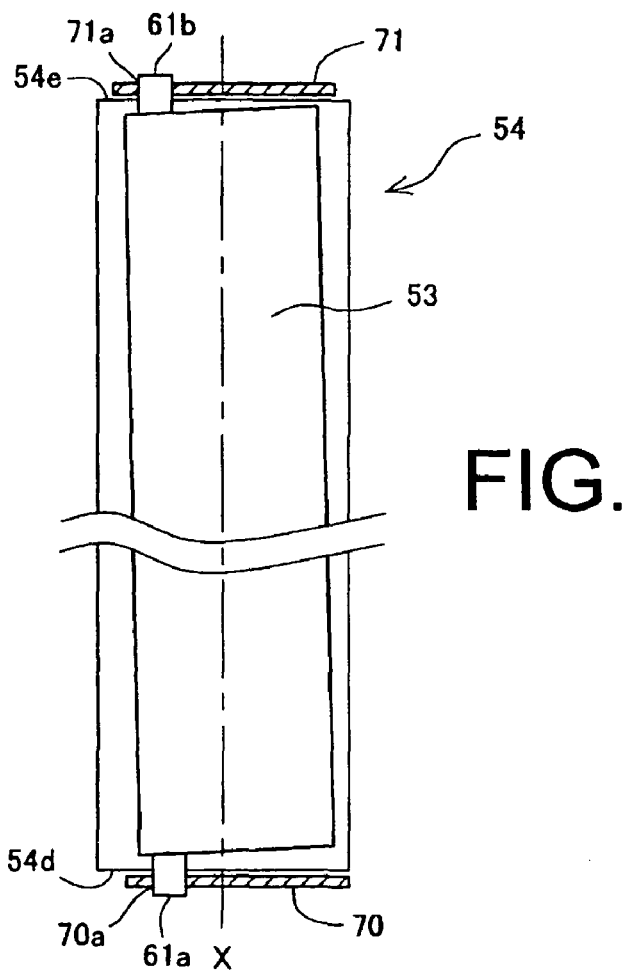
FIG. 11 contains a plan view and cross-sectional view showing a state where the white member is displaced and set.
Figure 11B:
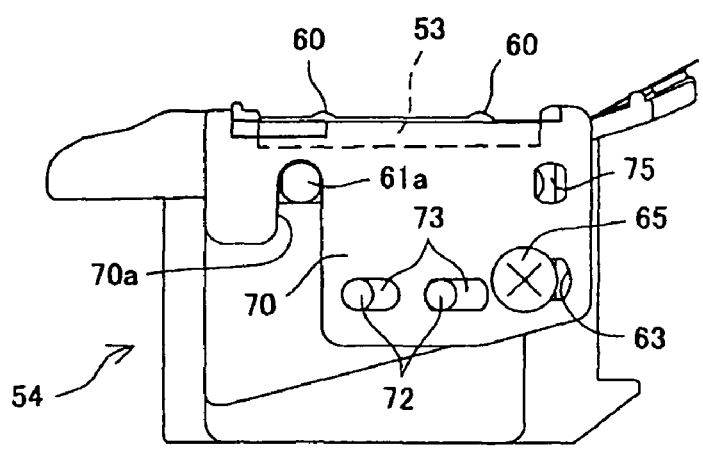

FIG. 11(a) shows a state where one holding member 70 is slid and shifted i.e. a state where the white member 53 is slid. Thus, when the white member 53 is slid, as shown in FIG. 11(b), the mounting screw 65 is removed, one holding member 70 is slid rightward as viewed in the figure, the mounting screw 65 is inserted into the long hole of the second insertion hole 63 and fastened to the screw hole, and as shown in FIG. 11(a), the white member 53 is set while being tilted with respect to the holder member 54.

As shown in FIGS. 10 and 11, by slightly adjusting the position of the white member 53 by sliding, it is possible to displace the background position of a read line X through the contact glass 7. By this means, when dust and/or stain is present on the normal read line X, it is possible to perform shading processing in the position for avoiding the dust and/or stain by sliding the white member 53.

Further, on the back of the backup glass 52 is provided a regulating member 70 with which the white member 53 comes into contact. The regulating means 70 is to secure a gap between the backup glass 52 and white member 53 in the reading position, and securing the gap prevents the occurrence of Newton ring which is caused by the white member 53 coming into contact with the backup glass 52.

According to this embodiment, since such a configuration is provided that the backup unit 20 is removably attached to the guide member 51, maintenance is made ease such as cleaning, position adjustments and the like of the white member 53 and backup glass 52.

Further, the guide member 51 is configured to be able to rotate to the position for removing the backup unit 20 to perform maintenance, it is further configured that by this rotation operation of the guide member 51, the contact glass 7 is exposed and also undergoes maintenance, and therefore, maintenance of the contact glass 7 is also made ease, as well as maintenance such as cleaning, position adjustments and the like of the white member 53 and backup glass 52.

Furthermore, it is possible to temporarily install the backup unit 20 with the white member 53 inclined, by the engagement hole and engagement click respectively provided in the concave portion 56 and backup unit 20, and the ribs and compression spring provided in the concave portion 56. By this means, in rotating the guide unit 9 toward the document feeding apparatus A, without requiring any particular adjustment, the white member 53 is opposed to the contact glass 7 surface of the reading unit to be substantially parallel therewith, and in this state, the guide member 51 elastically accommodates the backup unit 20.

Moreover, since the white member 53 is attached to the holder member 54 to enable its slide adjustment, even when dust and/or stain adheres to the background of the reading surface via the contact glass 7 of the white member 53, it is possible to perform shading processing while avoiding the dust and/or stain without exchanging the white member 53.

What is claimed is:

1. A document reading apparatus for reading an original document moving thorough a reading position, comprising:
   contact glass having a predetermined reading position;
   feeding means for feeding an original document to the contact glass;
   reading means for reading the original document fed to the contact glass;
   guide means, disposed on the side opposite to the contact glass, for guiding the original document to be fed to the contact glass;
   backup means, having a white member disposed in a position opposite to the contact glass to back up the original document to be read, for guiding the original document to be read;
   a guide unit configured by integrating the guide means and the backup means; and
   support means for supporting the guide unit to be able to travel between a close position for bringing the guide means and the backup means near the contact glass and an open position for distancing the guide means and the backup means from the contact glass,
   wherein a concave portion for removably accommodating the backup means is formed in the guide unit, and the backup means is inserted into the concave portion so that an original document guide face of the guide means and an original document guide face of the backup means form a continuous guide face when the guide unit travels to the close position.

2. The document reading apparatus according to claim 1, wherein the guide unit is supported by the support means around a rotation shaft provided on one end side thereof, and the backup unit is exposed upward when the guide unit travels to the open position.

3. The document reading apparatus according to claim 1, wherein further provided are a biasing member formed between the backup means and a bottom of the concave portion of the guide unit to bias the backup means, an engagement click formed on one side of the backup means, and an engagement hole formed on one inner face of the concave portion to engage with the engagement click, and
   when the backup means is inserted into the concave portion, the backup means is held in the concave portion by the engagement hole formed on one inner face of the concave portion engaging with the engagement click formed on one side of the backup means, and the other side of the backup means coming into contact with the ribs provided on the other inner face of the concave portion to protrude.

4. A document reading apparatus for reading an original document moving thorough a reading position, comprising:
   a paper feed tray to mount an original document;
   a paper discharge tray to store the original document;
   transport means for transporting the original document to the paper discharge tray from the paper feed tray;
   a U-shaped transport path extending from the paper feed tray to the paper discharge tray;
   contact glass having a predetermined reading position to read the original document;
   reading means, disposed on the inner side of the U-shaped transport path, for reading the original document fed through the contact glass;
   a backup unit, disposed opposite to the contact glass, having a transparent member forming a path between the transparent member and the contact glass to pass the original document and a white member disposed on the rear side, different from the contact glass side, of the transparent member;
   a guide member having a guide portion for guiding the original document to be transported to the contact glass and a concave portion into which the backup unit is removably inserted; and
   support means for exposing the contact glass, while supporting the guide member to be able to rotate to a position enabling the backup unit to be removable with respect to the concave portion of the guide member.

5. The document reading apparatus according to claim 4, wherein the backup unit has a holder member to which are attached the transparent member and the white member, and adjusting means for adjusting a position for attaching the white member to the holder member.

6. The document reading apparatus according to claim 4, further comprising:
   holding means for holding the backup unit inserted into the concave portion of the guide member.

* * * * *